No. 640,566. Patented Jan. 2, 1900.
W. S. HUTSON.
TAPE NEEDLE.
(Application filed Apr. 19, 1899.)
(No Model.)
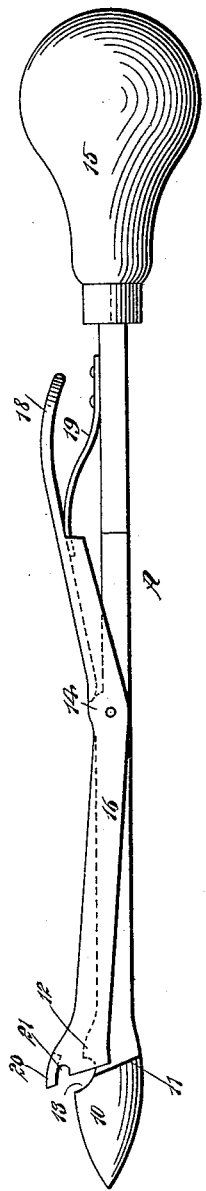
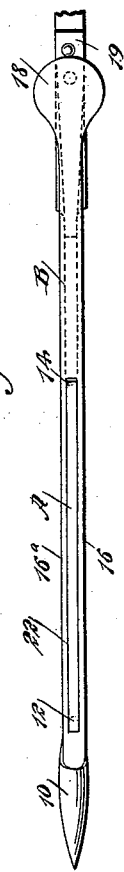
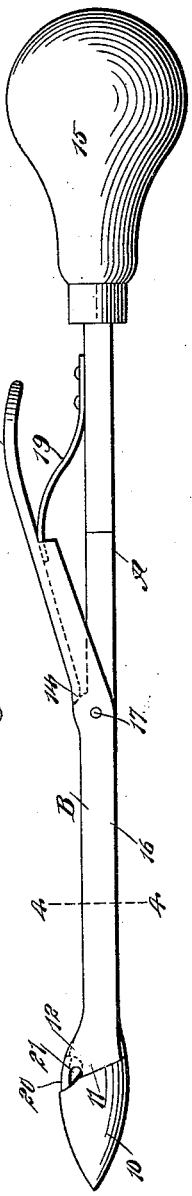
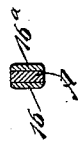
WITNESSES:
Chas. D. King
J. Fedetcker
INVENTOR
Walter S. Hutson
BY
ATTORNEYS.
THE NORRIS PETERS CO., PHOTO-LITHO., WASHINGTON, D. C.

UNITED STATES PATENT OFFICE.

WALTER S. HUTSON, OF POCATELLO, IDAHO.

TAPE-NEEDLE.

SPECIFICATION forming part of Letters Patent No. 640,566, dated January 2, 1900.

Application filed April 19, 1899. Serial No. 713,616. (No model.)

*To all whom it may concern:*

Be it known that I, WALTER S. HUTSON, of Pocatello, in the county of Bannock and State of Idaho, have invented a new and Improved Device for Stringing Hams, of which the following is a full, clear, and exact description.

The object of my invention is to so construct a device for stringing hams, shoulders, and other meat that a string may be quickly placed in position in the device and the device and string expeditiously and conveniently passed through the meat, and whereby, further, the string may be readily released from the device and left in the meat in position for tying.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved device, illustrating the locking-arm in position to receive a string. Fig. 2 is a side elevation of the device, illustrating the locking-arm as closed upon the shank, being in position to retain a string that is to be passed through the meat. Fig. 3 is a plan view of the improved device, the handle portion being broken away; and Fig. 4 is a transverse section on the line 4 4 of Fig. 2.

The device consists, primarily, of a body-bar or shank A and a locking-arm B. The body-bar or shank is usually rectangular in cross-section and terminates at one end in a spear-head 10, a portion of the head extending beyond the plane of the upper surface of the body or shank and likewise beyond the plane of each of its sides, and the inner end of the said spear-head is beveled or inclined. Under such a construction two side shoulders 11 are formed and the shank or body-bar is provided with a lug 12, formed upon its upper edge or surface adjacent to the inner end of the spear-head 10, and a recess 13 is produced in the spear-head, which recess is continued to the lug 12, as shown best in Fig. 1. The lug 12 is inclined upwardly and outwardly in direction of the spear-head, and the body-bar or shank is provided with a second lug 14, oppositely inclined, said second lug 14 being upon the upper edge or surface of the body or shank, at or near its center. The inner end of the body-bar or shank A is provided with a suitable handle 15.

The locking-arm B is U-shaped in cross-section and comprises two side members 16 and 16ª, connected at the upper portion of their forward and rear ends, and the space between the side members of the locking-arm is sufficient to neatly receive the body-bar A. The locking-arm is pivoted upon the body-bar or shank by a suitable pin 17, located just below the inner lug 14, and the rear portion of the locking-arm is upwardly inclined, so that it extends normally some distance above the upper edge of the body-bar or shank, and the locking-arm is held in a closed position—namely, with its forward end in engagement with the rear end of the spear-head 10—by means of a spring 19, attached to the body-bar, which spring has bearing against the under surface of a thumb-piece 18, that constitutes a rear extension of the locking-arm, as shown particularly in Fig. 2. The forward end of the locking-arm is of a width corresponding to the width of the rear end of the spear-head 10 and conforms to the inclination of said spear-head at that point. The forward end of said locking-arm is provided with a finger 20 at its upper edge and a recess 21 immediately below said finger. The locking-arm is further provided with a longitudinal slot 22 in its upper surface, as shown in Fig. 3, and this slot is of a length corresponding to the distance between the forward face of the front lug 12 and the rear face of the rear lug 14 of the body-bar or shank. When the locking-arm is in its closed position, as shown in Fig. 2, the bottom and top portions of the locking-arm at its forward end constitute virtually continuations of the top and bottom edges of the spear-head 10 and the rear end of the finger 20 on the locking-arm is in engagement with the front edge of the forward lug 12 of the body-bar and the rear wall of the slot 22 is in engagement with the rear edge of the lug 14. Under such a construction it is obvious that the spear-head and portion of the device adjacent thereto may be passed through an exceedingly solid piece of meat and even may contact with a bone without danger of the locking-arm being forced to an open position, since the lugs 12 and 14, in conjunction with the spring 19, serve to hold the locking-arm firmly in place.

In operation the thumb-piece 18 is pressed downward, thus elevating the forward end of the locking-arm, as shown in Fig. 1. A string is then introduced near its end into the recess 21 at the forward end of the locking-arm, whereupon the thumb-piece 18 is relieved from pressure and the locking-arm will close, assuming the position shown in Fig. 2, the cord or string being retained in the recess 21, the open end of said recess being then closed by the engagement of the locking-arm with the spear-head. The spear-head is now introduced into the meat at one side and forced out beyond the other side, carrying the cord with it. The device is passed sufficiently far through the opening in the meat to bring the meat rearward of the pivot 17, whereupon the thumb-piece will be depressed, thus raising the forward end or jaw of the locking-arm and releasing the cord. The device is now withdrawn from the meat, and one end of the cord will be at each side of the piece of meat, and the ends of said cord may be readily tied together.

The device is exceedingly simple and will enable one even when not skilled in the art to quickly place a cord in position for tying in any piece of meat. Furthermore, the device may be handled with safety to the operator.

Having thus described my invention, I claim as new and desire to secure by Letters Patent—

1. In a device for stringing hams, or for like purposes, the combination, with a body-bar provided with a piercing-head having inclined shoulders, a portion of the head extending beyond an edge of the said bar, which edge of the bar is provided with a lug adjacent to the piercing-head, and a second lug between the ends of the bar, of a locking-arm comprising two side pieces spaced apart pivotally mounted on the body-bar, the said locking-arm having its outer end adapted for engagement with the shoulders of the said piercing-head, the said outer end of the locking-arm being provided with a recess adapted to receive a cord, the arm having also a longitudinal recess therein, the end walls whereof are adapted to engage with the lugs on the locking-arm, and a spring arranged to normally hold the recessed end of the locking-arm in engagement with the piercing-head, as described.

2. The combination of a shank having its end formed with a pointed head terminating in shoulders at its inner ends, a locking-arm pivotally mounted on the shank and comprising two side members connected with each other, said side members respectively lying on the sides of the shank and the locking-arm having its front end arranged to engage the shoulders of the head of the shank to limit the movement of the locking-arm, the front end of the locking-arm being formed with a recess to receive a thread, the recess being closed at the head of the shank when the locking-arm is engaged therewith, and a spring serving to throw the locking-arm into closed position.

WALTER S. HUTSON.

Witnesses:
D. W. CHURCH,
E. C. WHITE.